United States Patent
Iguchi

(10) Patent No.: US 12,393,014 B2
(45) Date of Patent: Aug. 19, 2025

(54) OBJECTIVE OPTICAL SYSTEM, IMAGING UNIT, ENDOSCOPE AND ENDOSCOPE APPARATUS

(71) Applicant: OLYMPUS CORPORATION, Hachioji (JP)

(72) Inventor: Yoshihito Iguchi, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 38 days.

(21) Appl. No.: 18/438,521

(22) Filed: Feb. 12, 2024

(65) Prior Publication Data
US 2024/0192479 A1    Jun. 13, 2024

Related U.S. Application Data

(63) Continuation of application No. PCT/JP2021/034548, filed on Sep. 21, 2021.

(51) Int. Cl.
*G02B 23/24* (2006.01)
*G02B 5/30* (2006.01)
(Continued)

(52) U.S. Cl.
CPC ......... *G02B 23/243* (2013.01); *G02B 5/3083* (2013.01); *G02B 27/283* (2013.01); *H04N 23/555* (2023.01)

(58) Field of Classification Search
CPC .... H04N 23/555; G02B 13/04; G02B 23/243; G02B 23/26; G02B 27/283; G02B 5/3083
(Continued)

(56) References Cited

U.S. PATENT DOCUMENTS 6,480,330 B1    11/2002    McClay et al.
6,680,794 B2    1/2004    McClay et al.
(Continued)

FOREIGN PATENT DOCUMENTS

JP    2008293029 A    12/2008
JP    6463573 B1    1/2019
(Continued)

OTHER PUBLICATIONS

International Search Report (ISR) (and English language translation thereof) dated Dec. 7, 2021 issued in International Application No. PCT/JP2021/034548.
(Continued)

*Primary Examiner* — Behrooz M Senfi
(74) *Attorney, Agent, or Firm* — Holtz, Holtz & Volek PC

(57) ABSTRACT

An objective optical system comprising a lens group that forms an object image, a polarizing beam splitter having an optical path dividing surface that divides an optical path into a first optical path that intersects the optical axis of the lens group and a second optical path that extends straight on the optical axis, a first reflection surface provided in the first optical path, a second reflection surface provided in the second optical path, and a quarter wave plate provided between the polarizing beam splitter and the first reflection surface. The objective optical system satisfies the following conditional expression (1):

$$(Tp+Ts)/(100-Ts) \geq 1.25 \qquad (1)$$

where Tp (%) is the transmittance of the optical path dividing surface for p-polarized light, and Ts (%) is the transmittance of the optical path dividing surface for s-polarized light.

7 Claims, 9 Drawing Sheets

(51) Int. Cl.
*G02B 27/28* (2006.01)
*H04N 23/50* (2023.01)

(58) Field of Classification Search
USPC .......................................................... 348/65
See application file for complete search history.

(56) References Cited

U.S. PATENT DOCUMENTS

| | | | |
|---|---|---|---|
| 9,323,062 | B2 | 4/2016 | Nagaishi et al. |
| 9,459,443 | B2 * | 10/2016 | Uzawa ............... G02B 23/2446 |
| 10,893,793 | B2 * | 1/2021 | Tsuyuki ............. A61B 1/00188 |
| 11,375,882 | B2 * | 7/2022 | Homma ................... A61B 1/05 |
| 11,607,114 | B2 * | 3/2023 | Tsuyuki .................. A61B 1/051 |
| 2003/0086158 | A1 | 5/2003 | McClay et al. |
| 2015/0098132 | A1 | 4/2015 | Nagaishi et al. |
| 2019/0076001 | A1 * | 3/2019 | Tsuyuki ............... G02B 27/126 |
| 2020/0015656 | A1 | 1/2020 | Tsuyuki |
| 2020/0138275 | A1 | 5/2020 | Homma |

FOREIGN PATENT DOCUMENTS

| | | |
|---|---|---|
| WO | 2013190785 A1 | 12/2013 |
| WO | 2017203897 A1 | 11/2017 |
| WO | 2018186123 A1 | 10/2018 |

OTHER PUBLICATIONS

Written Opinion dated Dec. 7, 2021 issued in International Application No. PCT/JP2021/034548.
International Preliminary Report on Patentability (IPRP) (and English language translation thereof) dated Mar. 26, 2024, issued in International Application No. PCT/JP2021/034548.

* cited by examiner

OBJECTIVE OPTICAL SYSTEM, IMAGING UNIT, ENDOSCOPE AND ENDOSCOPE APPARATUS

CROSS REFERENCE TO RELATED APPLICATION

The present application is a continuation application of PCT/JP2021/034548 filed on Sep. 21, 2021, the entire contents of which are incorporated herein by reference.

BACKGROUND OF THE INVENTION

Technical Field

The present invention relates to an objective optical system, an imaging unit, an endoscope, and endoscope apparatus.

Description of the Related Art

There is technology related to imaging units called "high dynamic range", which is used to capture images of objects with large brightness differences or large variations in the light levels. The high dynamic range is the technology that creates an image with an expanded dynamic range by combining a plurality of images having different exposures or different brightnesses. This allows to create high dynamic range images.

Japanese Patent No. 6463573 discloses an endoscope imaging system that is configured to create a high dynamic range image from two images that are obtained from first frame data and differ in brightness and other two images that are obtained from second frame data and differ in brightness.

SUMMARY OF THE INVENTION

An objective optical system according to at least some embodiments of the present invention, comprises a lens group that forms an object image, a polarizing beam splitter having an optical path dividing surface that divides an optical path into a first optical path that intersects the optical axis of the lens group and a second optical path that extends straight on the optical axis, a first reflection surface provided in the first optical path, a second reflection surface provided in the second optical path, and a quarter wave plate provided between the polarizing beam splitter and the first reflection surface. The objective optical system satisfies the following conditional expression (1):

$$(Tp+Ts)/(100-Ts) \geq 1.25 \quad (1)$$

where Tp (%) is the transmittance of the optical path dividing surface for p-polarized light, and Ts (%) is the transmittance of the optical path dividing surface for s-polarized light.

An imaging unit according to at least some embodiments of the present invention comprises the objective optical system mentioned above and an imager that has an imaging surface located at the position of the object images formed by the objective optical system to capture two object images.

An endoscope according to at least some embodiments of the present invention comprises the imaging unit mentioned above.

An endoscope apparatus according to at least some embodiments of the present invention comprises the endoscope mentioned above and an image processor that combines the two object images.

DETAILED DESCRIPTION OF THE INVENTION

Prior to description of an example of the present invention, the operation and advantageous effects of embodiments according to certain modes of the present invention will be described. To describe the operation and advantageous effects of the embodiments specifically, specific exemplary modes will be given. However, the exemplary modes and examples that will be described later constitute only a portion of the modes encompassed by the present invention, which can include many variations. Therefore, it should be understood that the present invention is not limited by the exemplary modes.

First Embodiment

Figure 1:
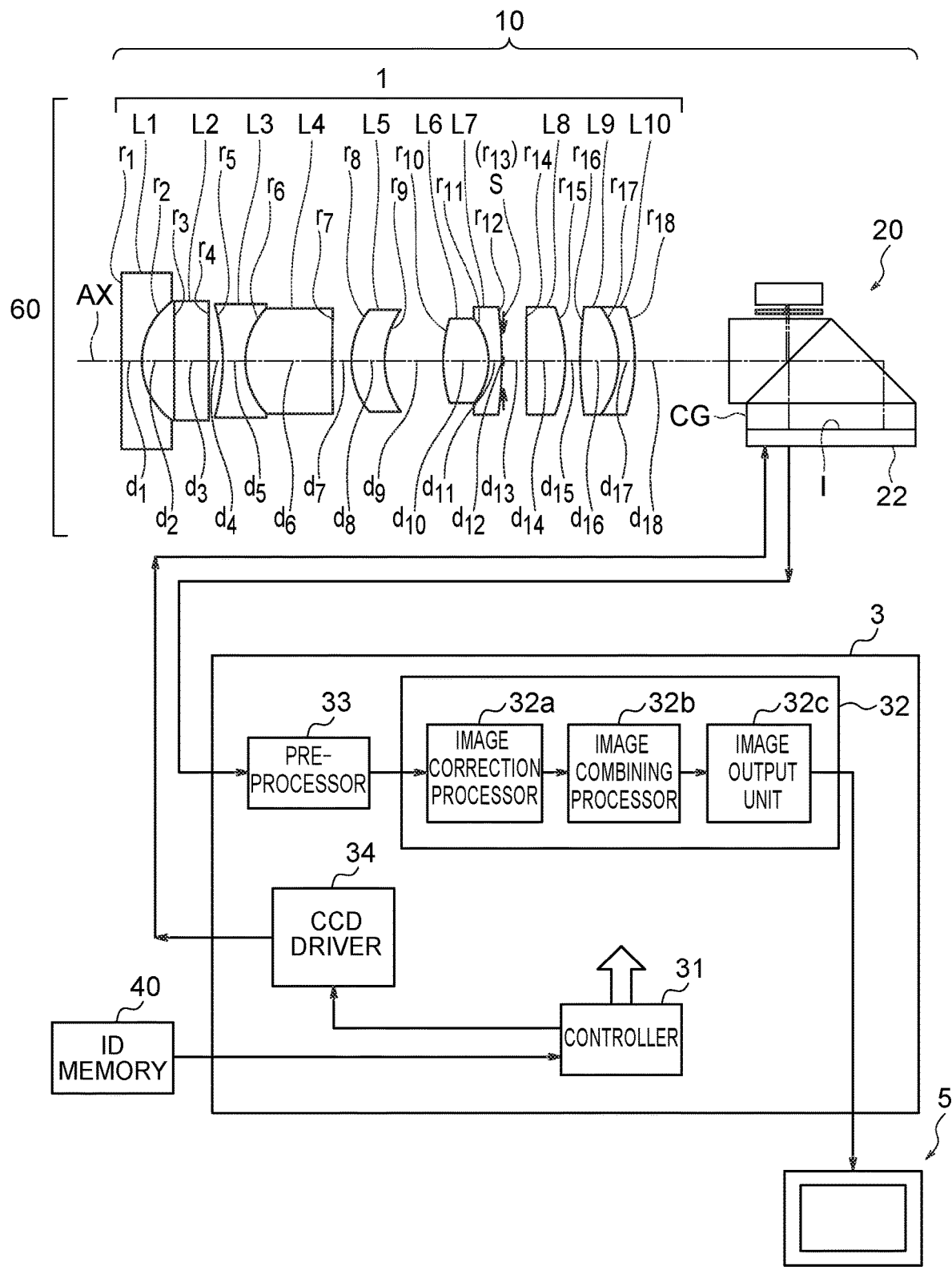
FIG. 1 is a diagram showing an objective optical system, an imaging unit, and a processor according to a first embodiment.

FIG. 1 is a diagram schematically showing the general configuration of an objective optical system 10, an imaging unit 60, and a processor 3 according to a first embodiment.

The objective optical system 10 includes a lens group 1 for forming an image of an object, a polarizing beam splitter 20 having an optical path dividing surface 21d (shown in FIG. 2) that divides the optical path into a first optical path A (shown in FIG. 2) that intersects the optical axis AX of the lens group 1 and a second optical path B that extends straight on the optical axis AX, a first reflection surface REF1 (shown in FIG. 2) provided in the first optical path A, a second reflection surface REF2 (shown in FIG. 2) provided in the second optical path B, and a quarter wave plate 21e provided between the polarizing beam splitter 20 and the first reflection surface REF1.

The polarizing beam splitter 20 satisfies the following conditional expression (1):

$$(Tp+Ts)/(100-Ts) \geq 1.25 \quad (1)$$

where Tp (%) is the transmittance of the optical path dividing surface 21d for p-polarized light, and Ts (%) is the transmittance of the optical path dividing surface 21d for s-polarized light.

The above transmittances are the values at the average wavelength of the visible light range for light travelling along the optical axis AX and incident on the optical path dividing surface 21d at an angle of 45 degrees.

The imaging unit 60 includes the objective optical system 10 and an imager 22 having an imaging surface I located at the position of the object image formed by the objective optical system 10 to capture two images of the object.

Figure 2:
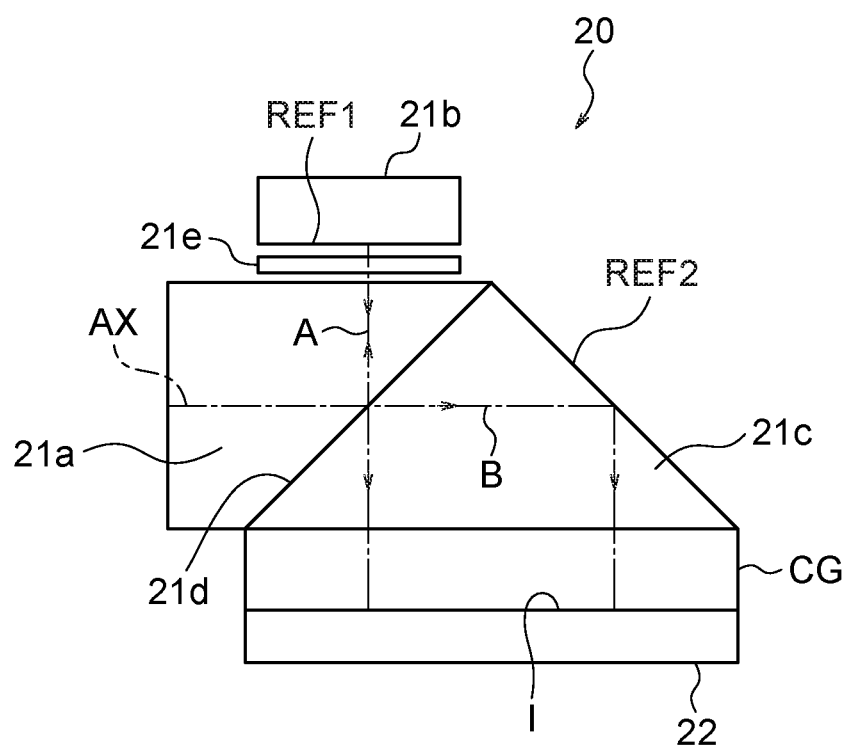
FIG. 2 is a diagram showing the structure of a polarizing beam splitter and an imager according to the first embodiment.

FIG. 2 is a diagram schematically showing the structure of the polarizing beam splitter 20 and the imager 22. According to a preferred mode of the embodiment, the objective optical system 10 includes the lens group 1 for focusing light beams coming from an object, the imager 22 disposed near the focal position of the lens group 1, and the polarizing beam splitter 20 disposed between the lens group 1 and the imager 22 and having the optical path dividing surface 21d that divides the light beams coming from the lens group 1 into reflected light beams and transmitted light beams.

The polarizing beam splitter 20 has the first reflection surface REF1 for reflecting back the light beams reflected by the optical path dividing surface 21d and the second reflection surface REF2 for reflecting the light beams transmitted by the optical path dividing surface 21d.

The light beams reflected by the first reflection surface REF1 and passing through the optical path dividing surface 21d are focused on a first light receiving area 22a (shown in FIG. 3) of the imager 22 to form a first object image (image A). The light beams reflected by the second reflection surface REF2 are focused on a second light receiving area 22b (shown in FIG. 3) of the imager 22 different from the first light receiving area 22a to form a second object image (image B).

The processor 3 shown in FIG. 1 has a pre-processor 33 that photo-electrically converts the first object image and the second object image to output a first imaging signal and a second imaging signal respectively. The processor 3 will be described in further detail later.

The structure of the polarizing beam splitter 20 will now be described with reference to FIG. 2. The polarizing beam splitter 20 according to this embodiment is designed to split beams by polarization.

The light emerging from the lens group 1 enters the polarizing beam splitter 20. The polarizing beam splitter 20 splits the object image into two object images through the optical path dividing surface 21d. The imager 22 is disposed on the exit side (or image plane side) of the polarizing beam splitter 20 to capture two object images formed in this way.

As shown in FIG. 2, the polarizing beam splitter 20 has an object side prism 21a, an image side prism 21c, a mirror 21b, and a quarter wave plate 21e. The object side prism 21a and the image side prism 21c have the optical path dividing surface 21d, which is slanted from the optical axis AX at an angle of 45 degrees.

The optical path dividing surface 21d of the object side prism 21a is made of a polarization splitting film. The object side prism 21a and the image side prism 21c abut on each other through the polarization splitting film constitutes the optical path dividing surface 21d to constitute the polarizing beam splitter 20.

The mirror 21b is disposed in the vicinity of an end surface of the object side prism 21a with the quarter wave plate 21e between. The imager 22 is attached to an end of the image side prism 21c via a cover glass CG. The numeral reference "I" in FIG. 2 indicates the image plane (or imaging surface).

The light coming from the lens group 1 is split by the optical path dividing surface 21d of the object side prism 21a into p-polarized transmitted light and s-polarized reflected light, so that the object image formed by the lens group 1 is separated into two, namely an object image with transmitted light and an object image with reflected light.

The transmittance properties of the optical path dividing surface 21d will be described later.

The object image with s-polarized light is reflected by the optical path dividing surface 21d in the direction away from the imager 22 to travel the optical path A, transmitted through the quarter wave plate 21e, and then reflected by the first reflection surface REF1 of the mirror 21b back toward the imager 22. The object image reflected back in this way is transmitted through the quarter wave plate 21e again to rotate its polarization direction by 90 degrees, transmitted through the optical path dividing surface 21d, and focused on the imager 22 as a low-exposure image A (shown in FIG. 3).

Figure 3:
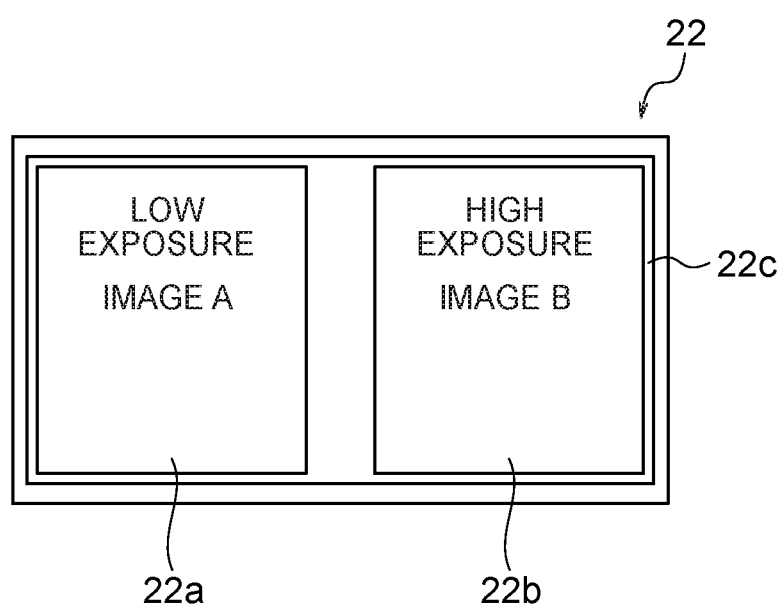
FIG. 3 is a diagram showing imaging areas of the imager according to the first embodiment.

The object image with p-polarized light is transmitted through the optical path dividing surface 21d to travel the optical path B, reflected by the second reflection surface REF2, and focused on the imager 22 as a high-exposure image B (shown in FIG. 3). The second reflection surface REF2 is a surface of the image side prism 21c located on the transmission side of the optical path dividing surface 21d to bend the optical path B perpendicularly toward the imager 22.

It is basically preferred that the first reflection surface REF1 and the second reflection surface REF2 have high reflectance. The reflectance may be finely adjusted to achieve fine adjustment of the light quantities of images of different exposures.

As above, the object side prism 21a and the image side prism 21c separate the object image into two object images of different exposures or different brightnesses.

FIG. 3 is a diagram showing the first light receiving area (effective pixel area) 22a and the second light receiving area (effective pixel area) 22b of the imager 22.

As shown in FIG. 3, the imager 22 has two light receiving areas in its entire pixel area, that is, the first light receiving area (effective pixel area) 22a and the second light receiving area (effective pixel area) 22b, so as to separately receive and capture two object images of different brightnesses.

The first light receiving area 22a and the second light receiving area 22b are arranged to coincide with the image plane in which the two object images are focused so that it can capture these object images formed thereon.

The imager 22 also has correction pixel areas 22c around the first light receiving area 22a and the second light receiving area 22b. The correction pixel area 22c is used to correct geometrical displacement between the two separate object images formed on the imager. Manufacturing errors are reduced in the correction pixel area 22c, and the geometrical displacement between the object images mentioned above is eliminated by correction through image processing performed by an image correction processor 32a (shown in FIG. 1), which will be described later.

As above, the system according to the embodiment has the quarter wave plate 21e that is disposed between the object side prism 21a and the first reflection surface REF1 to change the phase of the light beams reflected by the optical path dividing surface 21d. The light beams reflected by the first reflection surface REF1 are transmitted through the quarter wave plate 21e and focused on the first light receiving area 22a of the imager 22 through the polarizing beam splitter 20. In this way, the system can separate the light beams and capture the first object image with improved efficiency in utilization of the light quantity.

In the system according to the embodiment, the light beams transmitted through the optical path dividing surface 21*d* are reflected by the second reflection surface REF2, which is a surface of the image side prism 21*c* that is located on the transmission side of the optical path dividing surface 21*d* to bend the optical path B perpendicularly toward the imager 22, and focused on the second light receiving area 22*b* of the imager 22. In this way, the system can separate the light beams and capture the second object image with improved efficiency in utilization of the light quantity.

The system shown in FIG. 1 has an ID memory 40 used to store information on the difference in exposure between the first object image and the second object image on the imager 22.

The processor 3 shown in FIG. 1 will now be described. The processor 3 includes a controller 31, an image processor 32, a pre-processor 33, and a CCD driver 34.

The controller 31 controls the pre-processor 33, the CCD driver 34, and other circuits such as a power supply circuit and a signal processing circuit.

The pre-processor 33 receives imaging signals (namely, imaging signals for two object images of different exposures) from the imager 22 and applies pre-signal processing on the imaging signals. The pre-processor 33 includes known components or circuits such as a signal amplifier, a processing circuit, an A/D converter, and a white balance circuit.

The image processor 32 includes an image correction processor 32*a* for image correction, an image combining processor 32*b* for performing image combining processing for combining two images after correction, and an image output unit 32*c* for outputting the combined image to a display 5.

The image correction processor 32*a* applies correction to image signals of the two object images formed respectively on the first light receiving area 22*a* and the second light receiving area 22*b* of the imager 22 to substantially align the positions, angles and the magnifications of the two object images relative to each other.

Figure 9:
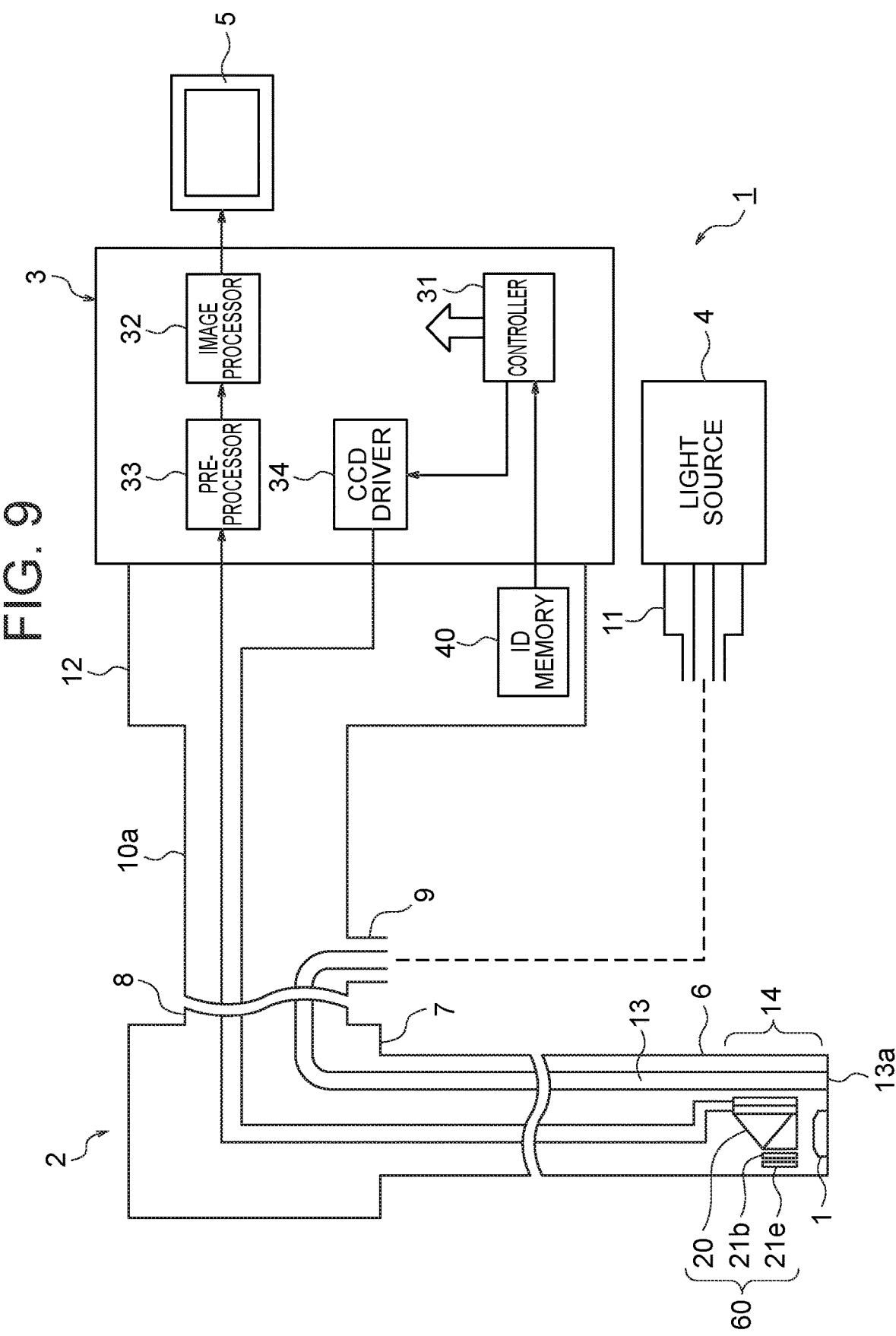
FIG. 9 is a diagram showing an endoscope and an endoscope apparatus according to a third embodiment.

The system shown in FIG. 1 includes a CCD driver, which drives the imager 22 in an endoscope 2 (shown in FIG. 9).

In the case where an object image is separated into two images that are focused separately on the imager 22, there is a possibility that a geometrical difference between them may arise. More specifically, the object images formed respectively on the first light receiving area 22*a* and the second light receiving area 22*b* (shown in FIG. 3) of the imager 22 may have a difference in the magnification, a positional displacement, and/or an angular displacement (i.e. rotational displacement) relative to each other.

Such differences or displacements can hardly be eliminated completely in the manufacturing process. If the differences or displacements are large, the combined image can be a double image (i.e. an image containing two slightly displaced images) or an image having unnaturally uneven brightness. To avoid this from happening, the image correction processor is configured to correct geometrical differences and brightness differences mentioned above.

The image combining processor 32*b* performs secondary image processing such as combining two images into one, color matrix, edge enhancement, and gamma correction. The image output unit 32*c* outputs an image that has undergone the secondary image processing. The image output unit 32*c* outputs the image to the display 5.

The system according to the embodiment is configured to combine two images of different exposures with the features that will be specifically described in the following. Satisfying the following conditional expression (1) allows an extended dynamic range without loss of light quantity.

$$(Tp+Ts)/(100-Ts) \geq 1.25 \quad (1)$$

Combining images of different exposures can extend the dynamic range. When conditional expression (1) is satisfied, it is possible to extend the dynamic range by 25% or more. In this way, it is possible to produce images of different exposures without loss of light quantity. Such images can resolve details more clearly than images that do not have an extended dynamic range. In particular, images with an extended dynamic range can resolve structures or features in the dark area that would be invisible in images without an extended dynamic range due to noises.

Moreover, the system according to the embodiment does not need the use of an element for reducing the light quantity. This allows a reduction in the manufacturing cost and an increase in the space.

It is more preferred that conditional expression (1) be further restricted by the following conditional expression (1'), (1"), or (1'").

$$(Tp+Ts)/(100-Ts) \geq 1.5 \quad (1')$$

Satisfying conditional expression (1') allows a reduction of noises in the dark portion of images (dark noises).

$$(Tp+Ts)/(100-Ts) \geq 2 \quad (1'')$$

Satisfying conditional expression (1") allows a sufficient reduction of halation in the bright portion of images.

$$(Tp+Ts)/(100-Ts) \geq 3 \quad (1''')$$

Satisfying conditional expression (1'") allows a sufficient reduction of noses in the dark portion of images.

Figure 4A:
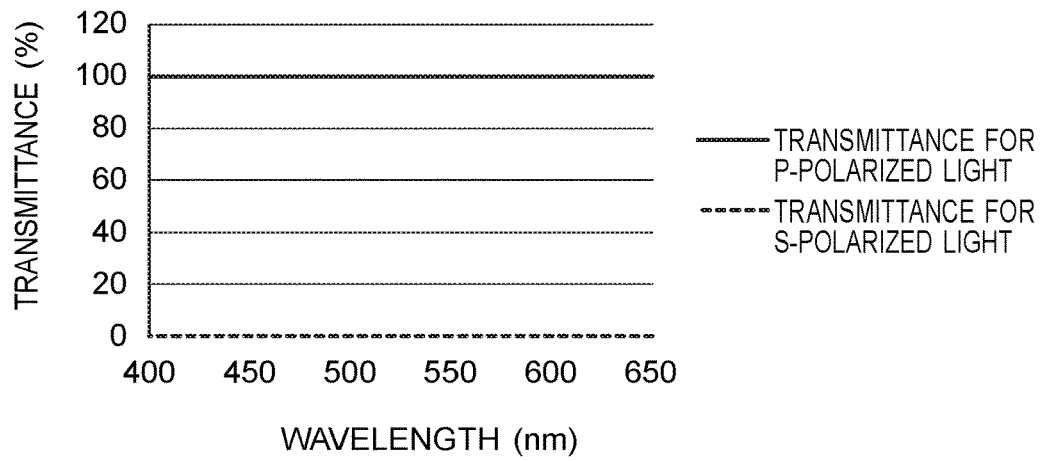
FIGS. 4A, 4B, and 4C show transmittance properties of polarizing beam splitters.
Figure 4B:
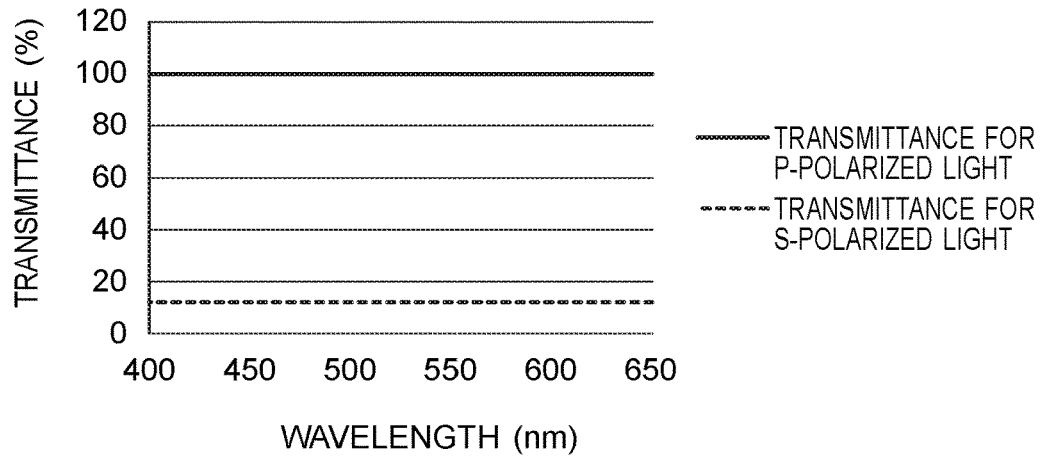
Figure 4C:
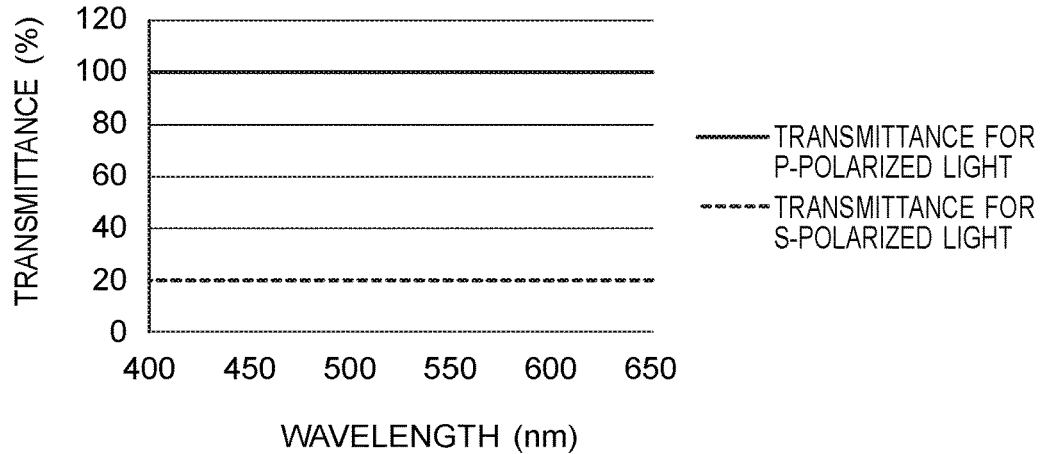

FIGS. 4A, 4B, and 4C show transmittance properties of the optical path dividing surface 21*d*.

FIG. 4A shows the transmittance of the optical path dividing surface 21*d* for p-polarized light and for s-polarized light in the case where the ratio of extend in the dynamic range (extended D range ratio) is 1.0.

FIG. 4B shows the transmittance of the optical path dividing surface 21*d* for p-polarized light and for s-polarized light in the case where the ratio of extend in the dynamic range (extended D range ratio) is 1.25.

FIG. 4C shows the transmittance of the optical path dividing surface 21*d* for p-polarized light and for s-polarized light in the case where the ratio of extend in the dynamic range (extended D range ratio) is 1.5.

Figure 5A:
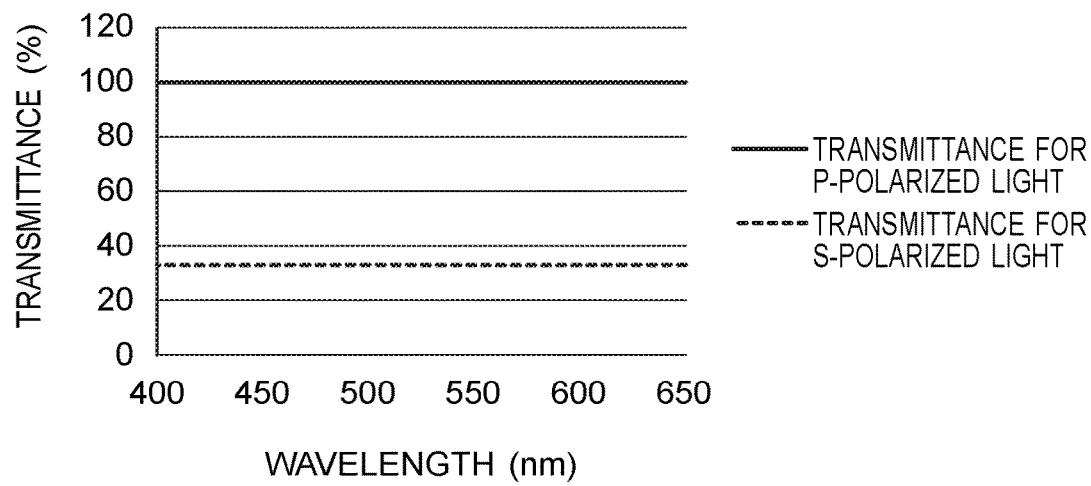
FIGS. 5A and 5B show other transmittance properties of polarizing beam splitters.
Figure 5B:
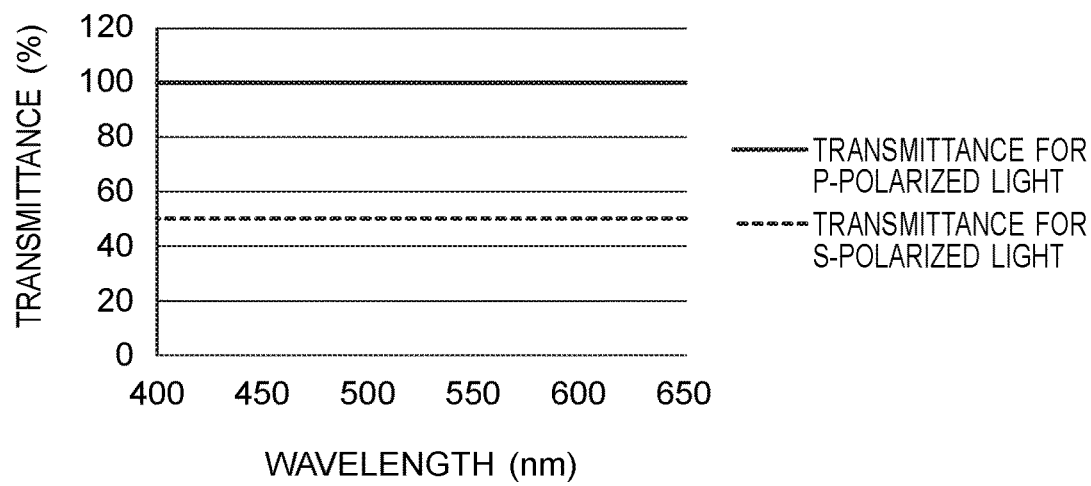

FIGS. 5A and 5B show other transmittance properties of the optical path dividing surface 21*d*.

FIG. 5A shows the transmittance of the optical path dividing surface 21*d* for p-polarized light and for s-polarized light in the case where the ratio of extend in the dynamic range (extended D range ratio) is 2.0.

FIG. 5B shows the transmittance of the optical path dividing surface 21*d* for p-polarized light and for s-polarized light in the case where the ratio of extend in the dynamic range (extended D range ratio) is 3.0.

Table 1 below shows exemplary values related to the system according to the embodiment for different extended D range ratios. The values of the transmittance and reflectance given in Table 1 are in percent. The values of the image intensity in surface A and the image intensity in surface B are in an arbitrary unit representing their relative value.

TABLE 1

| transmittance for p-polarized light | transmittance for s-polarized light | reflectance for s-polarized light | image intensity on surface A | image intensity on surface B | extended D range ratio |
|---|---|---|---|---|---|
| 100 | 0 | 100 | 100 | 100 | 1.00 |
| 100 | 11 | 89 | 89 | 111 | 1.25 |
| 100 | 20 | 80 | 80 | 120 | 1.50 |
| 100 | 33 | 67 | 67 | 133 | 2.00 |
| 100 | 50 | 50 | 50 | 150 | 3.00 |

According to a preferred mode of this embodiment, it is preferred that the following conditional expression (2) be satisfied:

$$80 \leq Tp \quad (2).$$

Conditional expression (2) defines an appropriate range of the transmittance for p-polarized light of the optical path dividing surface 21d. Satisfying conditional expression (2) allows a further reduction of loss of light quantity, leading to efficient use of light.

According to a preferred mode of this embodiment, it is preferred that the object image through the first optical path A and the object image through the second optical path B be formed on the same plane I (i.e. the imaging surface) on the exit side of the polarizing beam splitter 20.

Then, images of different exposures can be captured by a single imager 22.

Second Embodiment

Figure 6:
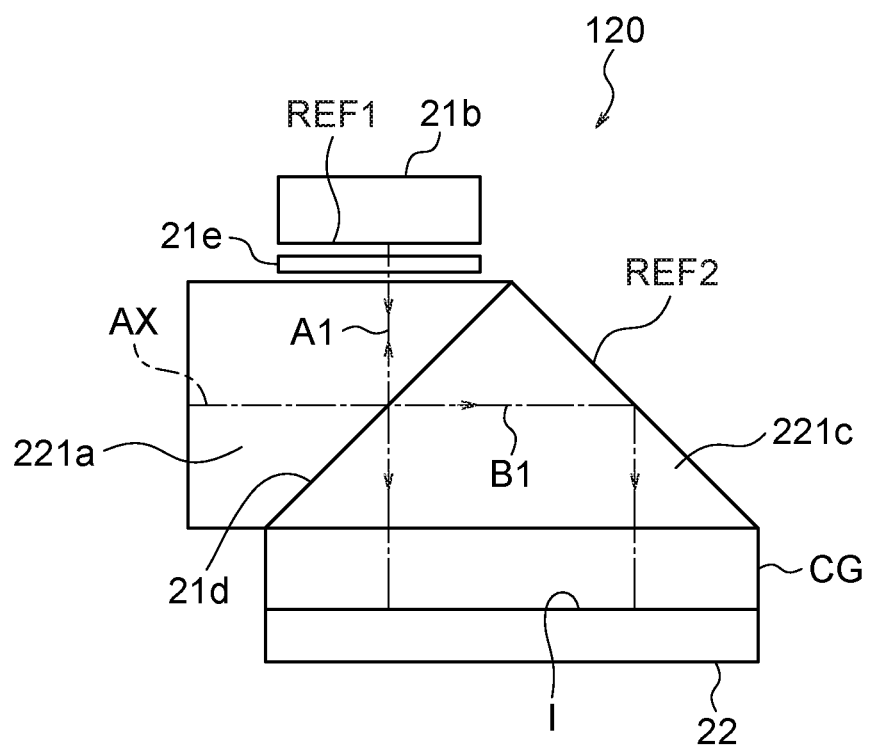
FIG. 6 is a diagram showing the structure of a polarizing beam splitter according to a second embodiment.

FIG. 6 is a diagram showing the structure of a polarizing beam splitter provided in an objective optical system according to a second embodiment. The components same as the corresponding components in the first embodiment are denoted by the same reference signs and will not be described in further detail.

The system according to the second embodiment is configured to achieve a high dynamic range as described in the above description of the first embodiment and also an extended depth of field. The configuration of the system or apparatus according to the second embodiment is the same as that shown in FIG. 1, but the procedure of processing applied to captured object images is different from that according to the first embodiment.

In the system according to the second embodiment, the optical path length of a first optical path A1 extending from the optical path dividing surface 21d to plane I (or the imaging surface) and the optical path length of a second optical path B1 extending from the optical path dividing surface 21d to plane I are different from each other.

FIG. 6 shows the structure of the polarizing beam splitter 120 used in the system according to the second embodiment. This system uses an object side prism 221a and an image side prism 221c to separate an object image into two optical images, namely object images with different focus positions. The polarizing beam splitter 120 is configured such that the optical path length (or glass path length) of the reflected light from the optical path dividing surface 21d to the imager 22 is shorter than the optical path length of the transmitted light from the optical path dividing surface 21d to the imager 22.

Figure 7:
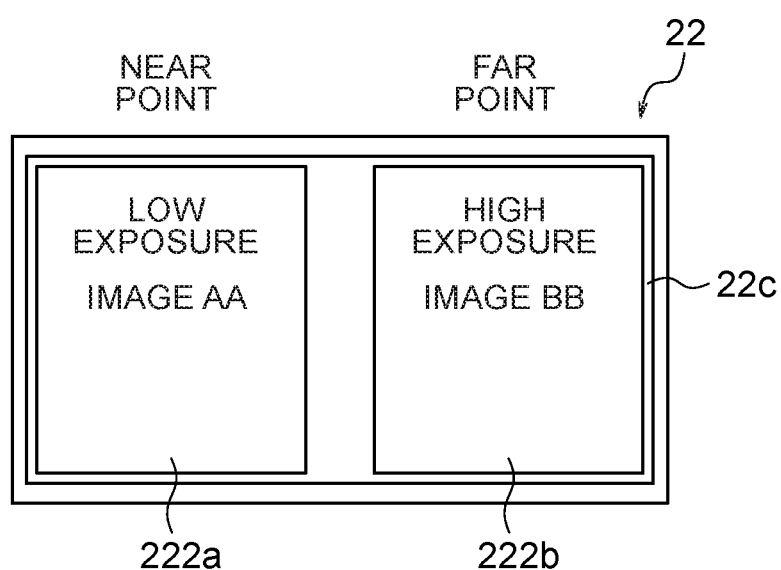
FIG. 7 is a diagram showing imaging areas of the imager according to the second embodiment.

As shown in FIG. 7, the imager 22 has a first light receiving area 222a and a second light receiving area 222b, which are arranged to coincide with the image plane of two object images to capture images of them. The focus position of the first light receiving area 222a of the imager 22 is relatively displaced from the focus position of the second light receiving area 222b toward near points, and the focus position of the second light receiving area 222b is relatively displaced from the focus position of the first light receiving area 222a toward far points. In this way, the system is configured such that two object images of different focus positions are formed on the light receiving surface of the imager 22.

The imager 22 separately receives and captures two object images AA and BB of different focus positions. For example, the object image AA of the near side focus position is the lower exposure image, and the object image BB of the far side focus position is the high exposure image.

Different glass materials may be used for the object side prism 221a and the image side prism 221c to create a difference in the optical path length to the imager 22 and to displace the focus positions for the first light receiving area 222a and the second light receiving area 222b relative to each other.

The image combining processor 32b (shown in FIG. 1) in the system according to the second embodiment has the function of increasing the depth of field in addition to the function of increasing the dynamic range described above. The image combining processor 32b chooses an image having higher contrast in each of the corresponding areas of the two images to create a combined image. More specifically, the image combining processor 32b compares the contrast of the two images in each of the spatially identical (or corresponding) pixel areas and chooses the image having higher contrast in each pixel area to create a single combined image from the two images.

The image output unit 32c outputs an image that has undergone the secondary image processing. The image output unit 32c outputs the image to the display 5.

As above, two object images of different focus positions are captured, and then the image combining processor 32d combines the captured images to achieve a combined depth of field. When an endoscope is used to view a large area for the purpose of screening, far observation is suitable. When an endoscope is used for the purpose of detailed observation of lesions or diagnosis, close observation is suitable.

Figure 8:
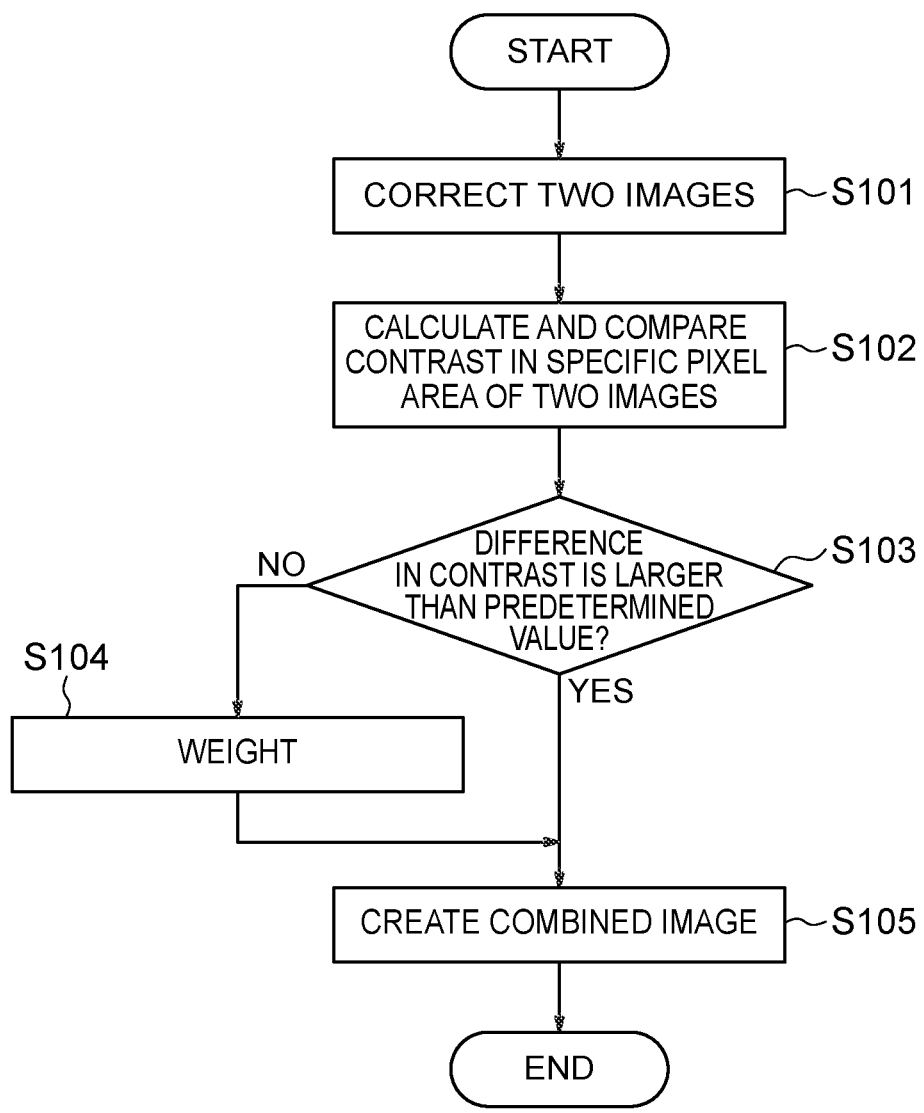
FIG. 8 is a flow chart of a process of combining two images according to the second embodiment.

It is preferred that the focus position of the darker object image be displaced toward near points, and the focus position of the brighter object image be displaced toward far points. This is because near points are brighter than far points, and far points are darker than near points. FIG. 8 is a flow chart of a process of combining two object images to extend the depth of field according to the second embodiment.

In step S101, correction of the image signals of the two object images of different focus positions (namely, the far point image and the near point image) captured by the imager 22 is performed by the image correction processor 32a.

Specifically, the image correction processor 32a corrects the two image signals according to predetermined correction parameters so as to substantially align the positions, angles, and magnifications of the optical images corresponding to the two image signals relative to each other and then outputs the corrected image signals to the image combining processor 32b. The image correction processor 32a may also correct the brightness and color difference of the two images, if necessary.

In step S102, the corrected two image signals are combined by the image combining processor 32b. In this process, the image combining processor 32b calculates contrast values in corresponding pixel areas of the near point image and the far point image and compares them.

In step S103, it is determined whether or not there is a difference larger than a predetermined value between the compared contrast values. If there is a large difference in the contrast value, the process proceeds to step S105, where the image of which the contrast value is higher is chosen in each pixel area and used in the combining process.

There may be cases where the difference between the contrast values is small, namely where the contrast values are substantially equal. This may lead to instability in the process of choosing either one of the far point image and the near point image. For example, when the signals are unstable due to noise or other cause, undesirable results may occur. For example, discontinuous areas may be created in the combined image, and/or a blurred image will be produced from resolved original object images.

To prevent the above troubles from occurring, in step S104, weighting is performed. When the contrast values of the two images are substantially equal in a pixel area in which the contrast values are compared, either one of the images is weighted, and the weighted images are added. In this way, instability in image choosing process is eliminated. In step S105, an image having a higher contrast value is chosen in each pixel area and used in the image combining process.

As above, according to the second embodiment, it is possible to produce an image with extended depth of field without creating discontinuous areas in the combined image due to noise or other causes or blurring the optical image in both the close observation and the far observation.

With the above features of the second embodiment, it is possible to extend the depth of field without deteriorating the resolving power even when an imager having an increased number of pixels is used, while achieving high dynamic range.

In the following, a numerical example of the lens group 1 will be described as shown in FIG. 1.

Numerical Example

The lens group 1 includes, in order from the object side, a planoconcave negative lens L1 having a planar surface facing the object side, a plane parallel plate L2, a biconcave negative lens L3, a positive meniscus lens L4 having a convex surface facing the object side, a positive meniscus lens L5 having a convex surface facing the object side, a biconvex positive lens L6, a negative meniscus lens L7 having a convex surface facing the image side, an aperture stop S, a biconvex positive lens L8, a biconvex positive lens L9, and a negative meniscus lens L10 having a convex surface facing the image side.

The negative meniscus lens L3 and the positive meniscus lens L4 are cemented together. The positive lens L6 and the negative meniscus lens L7 are cemented together. The positive lens L9 and the negative meniscus lens L10 are cemented together.

The polarizing beam splitter 20 is disposed on the image side of the lens group 1. The optical path is bent by the optical path dividing surface of the prisms in the polarizing beam splitter 20. The plane parallel plate L2 is a filter having a coating for cutting off light of a specific wavelengths, for example 1060 nm of YAG laser, 810 nm of semiconductor laser, or an infrared range. The reference "I" in FIG. 1 indicates the image plane (or imaging surface).

In the following numerical data of the above example is given, where r is the radius of curvature of each lens surface, d is the distance between adjacent surfaces, nd is the refractive index of each lens for d-line, νd is the abbe number of each lens, FNO is the F-number, ω is the half angle of view, and fb is the back focus. The back focus is the distance from the optical surface closest to the image side to the paraxial image surface, and it is represented by an equivalent distance in air. The total length is the distance from the lens surface closest to the object side to the optical surface closest to the image side (which is not an equivalent length in air) plus the back focus. The stop is an aperture stop.

Numeral Example

Unit mm
Surface data

| Surface number | r | d | nd | vd |
|---|---|---|---|---|
| 1 | 8 | 0.49 | 1.88300 | 40.76 |
| 2 | 1.812 | 0.79 | | |
| 3 | 8 | 0.84 | 1.52100 | 65.12 |
| 4 | 8 | 0.34 | | |
| 5 | −4.881 | 0.56 | 1.88300 | 40.76 |
| 6 | 1.866 | 2.13 | 1.84666 | 23.78 |
| 7 | 77.332 | variable | | |
| 8 | 2.010 | 0.81 | 1.48749 | 70.23 |
| 9 | 2.149 | variable | | |
| 10 | 3.354 | 1.13 | 1.64769 | 33.79 |
| 11 | −1.665 | 0.32 | 2.00330 | 28.27 |
| 12 | −9.987 | 0.04 | | |
| 13(stop) | ∞ | 0.56 | | |
| 14 | 512.363 | 0.95 | 1.69895 | 30.13 |
| 15 | −3.552 | 0.36 | | |
| 16 | 9.128 | 0.94 | 1.48749 | 70.23 |
| 17 | −2.180 | 0.39 | 1.92286 | 18.90 |
| 18 | −4.093 | 4.59 | | |
| 19 (image pick up plane) | ∞ | | | |

Various data

| Focal length | 1.00 |
|---|---|
| F NO. | 3.58 |
| angle of view 2ω | 144.9 |
| fb (in air) | 4.59 |
| entire length (in air) | 17.15 |
| d7 | 0.47 |
| d9 | 1.43 |

Third Embodiment

FIG. 9 shows the configuration of an endoscope 2 and an endoscope apparatus 1 according to a third embodiment. The endoscope 2 and the endoscope apparatus 1 are designed to reduce loss of light quantity and to extend the dynamic range and the depth of field.

The endoscope 2 has the imaging unit 60 described in the above description of the first embodiment.

The endoscope apparatus 1 includes the endoscope 2 and an image processor 32 configured to combine two object images.

As shown in FIG. 9, the endoscope apparatus 1 according to the third embodiment has the endoscope 2, a processor 3 that is detachable connected to the endoscope 2 to perform specific signal processing, a light source 4 that is detachably connected with the endoscope 2 to supply illumination light to the endoscope 2, and a display 5 that displays endoscope images based on image signals produced by the processor 3.

The endoscope 2 has a thin, long insert part 6 to be inserted into a body cavity, an operation unit 7 provided at the rear end of the insert part 6, and a universal cord 8 extending from the operation unit 7. The universal cord 8 branches into a light guide cord 9 and a signal cord (or signal cable) 10a at a point near the base end or a midpoint.

The light guide cord 9 has an optical source connector 11 at its end, which is detachably connected to the light source 4. The signal cord 10a has a signal connector 12 at its end, which is detachably connected to the processor 3.

The signal connector 12 is provided with an ID memory 40. The ID memory 40 is a storage unit that stores individual information for each endoscope 2, for example individual information related to the polarizing beam splitter 20 and the imager 22.

A light guide 13 for transmitting illumination light is inserted through the operation unit 7 and the universal cord 8. As the light source connector 11 is connected to the light source 4, illumination light emitted from the light source 14 is transmitted through the light guide 13, and the transmitted illumination light is emitted from the end face 13a of the light guide 13 attached to an illumination window provided in the distal end 14 of the insert part 6.

Alternatively, a combined connector including the light source connector 11 and the signal connector 12 may be used. The combined connector may be connected to the light source 4, and signals may be transmitted between the signal connector 12 and the processor 3 through a cable that connects the light source 4 and the processor 3.

The distal end 14 is provided with an observation window (or imaging window) which is diposed adjacent to the illumination window. The imaging unit 60 including the objective optical system 1 is provided in the observation window (shown in FIG. 1). The imaging unit 60 captures an optical image of an object such as an affected area illuminated with illumination light.

An example of the imager 22 is a CCD image sensor. The imager 22 is connected to the processor 3 through the cable that is passed through the insert part 6 and the universal cord 8 and the signal connector 12.

As described above, the imager 22 used in the apparatus according to the third embodiment is configured such that the first and second object images, which are different optical images separated from each other, are formed (or focused) on specific areas of the same imaging surface of the CCD that are respectively corresponding to the two object images.

The apparatus according to the third embodiment is configured to store information on the difference in exposure between the low-exposure first object image and the high-exposure second object image in the ID memory 40. This information is related to the polarizing beam splitter 20. This information will also be referred to as the exposure difference information.

As described above, the controller 31 controls various circuits in the processor 3. When the endoscope 2 is connected to the processor 3, the processor 3 obtains focus position information and the exposure difference information stored in the ID memory 40 provided in the signal connector 12. The focus position information and the exposure difference information are individual information on the endoscope 2.

As above, the endoscope and the endoscope apparatus according to the third embodiment can reduce loss of light quantity and extend the dynamic range.

The polarizing beam splitter 120 described in the description of the second embodiment may be used in the endoscope apparatus 1 according to the third embodiment. The endoscope and the endoscope apparatus using the polarizing beam splitter 120 according to the second embodiment can reduce the loss of light quantity and extend the dynamic range and the depth of field.

The objective optical system, the imaging unit, the endoscope, and the endoscope apparatus described above may adopt two or more of the above-described features.

Adopting two or more features can improve the performance of the endoscope apparatus. Features to be adopted may be selected in any desired combination. The conditional expressions that further limit the upper and lower bounds of preceding conditional expressions may be modified to limit only one of the upper and lower bounds.

While some embodiments of the present invention have been described, it should be understood that the present invention is not limited to or by the embodiments. It should also be understood that other embodiments that adopt any combination of the features of the above-described embodiment are also falls within the scope of the present invention.

As above, the present invention can be suitably applied to objective optical systems, imaging units, endoscopes, and endoscope apparatuses that are desired to achieve a reduction of loss of light quantity and/or an extend in the dynamic range.

The present invention can provide an objective optical system, an imaging unit, an endoscope, and an endoscope apparatus that can reduce the loss of light quantity and produce images with an extended dynamic range.

What is claimed is:

1. An objective optical system comprising:
    a lens group that forms an object image;
    a polarizing beam splitter having an optical path dividing surface that divides an optical path into a first optical path that intersects the optical axis of the lens group and a second optical path that extends straight on the optical axis;
    a first reflection surface provided in the first optical path;
    a second reflection surface provided in the second optical path; and
    a quarter wave plate provided between the polarizing beam splitter and the first reflection surface,
    wherein the objective optical system satisfies the following conditional expression (1):

$$(Tp+Ts)/(100-Ts) \geq 1.25 \tag{1}$$

where $Tp$ (%) is the transmittance of the optical path dividing surface for p-polarized light, and $Ts$ (%) is the transmittance of the optical path dividing surface for s-polarized light.

2. An objective optical system according to claim 1, satisfying the following conditional expression (2):

$$80 \leq Tp \tag{2}$$

3. An objective optical system according to claim 1, wherein the object image formed through the first optical path and the object image formed through the second optical path are formed on the same plane.

4. An objective optical system according to claim 3, wherein the optical path length of the first optical path extending from the optical path dividing surface to the plane and the optical path length of the second optical path extending from the optical path dividing surface to the plane are different from each other.

5. An imaging unit comprising:
    an objective optical system according to claim 1; and
    an imager that has an imaging surface located at the position of the object images formed by the objective optical system to capture the two object images.

6. An endoscope comprising an imaging unit according to claim 5.

7. An endoscope apparatus comprising:
an endoscope according to claim 6; and
an image processor that combines the two object images.

* * * * *